United States Patent [19]

Charhut

[11] Patent Number: 5,375,852
[45] Date of Patent: Dec. 27, 1994

[54] ROTATING SEAL BODY FOR FACE TYPE SEAL

[75] Inventor: Frank J. Charhut, Northfield, Ill.

[73] Assignee: Chicago-Allis Manufacturing Corporation, Chicago, Ill.

[21] Appl. No.: 96,065

[22] Filed: Jul. 22, 1993

Related U.S. Application Data

[63] Continuation of Ser. No. 959,173, Oct. 9, 1992, abandoned, which is a continuation of Ser. No. 682,124, Apr. 8, 1991, abandoned.

[51] Int. Cl.⁵ .............................................. F16J 15/34
[52] U.S. Cl. ........................................ 277/42; 277/89; 277/92; 277/93 R; 277/22
[58] Field of Search .................... 277/22, 88, 89, 92, 277/93 R, 93 SD, 96.2, 38–41, 42, 43, 90

[56] References Cited

U.S. PATENT DOCUMENTS

| | | | |
|---|---|---|---|
| 2,432,694 | 12/1947 | Snyder | 277/42 |
| 2,463,695 | 3/1949 | Jensen | 277/89 |
| 2,467,239 | 4/1949 | Snyder | 277/89 |
| 2,692,787 | 10/1954 | Brummer . | |
| 2,706,652 | 4/1955 | Berger | 277/41 |
| 2,752,176 | 6/1956 | Ayling | 277/89 |
| 2,992,024 | 7/1961 | Barrett et al. . | |
| 2,995,391 | 8/1961 | Synder . | |
| 3,025,069 | 3/1962 | Harker | 277/22 |
| 3,370,856 | 2/1968 | Buske | 277/89 |
| 3,704,019 | 11/1972 | McHugh . | |
| 3,838,901 | 10/1974 | Sampatacos . | |
| 3,895,811 | 7/1975 | Richard, Jr. et al. | 277/22 |
| 4,114,899 | 9/1978 | Külzer et al. | 277/85 X |
| 4,191,386 | 3/1980 | Hershey | 277/22 |
| 4,451,049 | 5/1984 | Charhut | 277/89 X |
| 4,491,331 | 1/1985 | Salant et al. . | |
| 4,502,698 | 5/1985 | Collins | 277/84 X |
| 4,768,923 | 9/1988 | Baker . | |
| 4,776,759 | 11/1988 | Maskell et al. | 277/22 X |
| 4,917,389 | 4/1990 | Baker et al. | 277/89 X |
| 4,973,224 | 11/1990 | Pesch | 277/22 X |
| 5,123,660 | 6/1992 | Dahlheimer et al. | 277/22 X |

FOREIGN PATENT DOCUMENTS

| | | | |
|---|---|---|---|
| 2216815 | 11/1972 | Germany | 277/43 |
| 2405535 | 8/1974 | Germany | 277/22 |

Primary Examiner—William A. Cuchlinski, Jr.
Assistant Examiner—Scott W. Cummings
Attorney, Agent, or Firm—Martin Faier; Eugene F. Friedman

[57] ABSTRACT

A rotating seal body for a face type seal having a rotor portion secured on and rotatable with a shaft and a stator portion for securement in a housing and sealing faces on each of the portions in rubbing abutment, wherein the seal has thermally conductive components providing a heat flow path from the rotor face through the stator portion to the housing for dissipating heat of friction generated between the rubbing faces. The seal may be unitized by a lip on the rotor portion which interconnects and is engaged with the stator portion for connecting the seal portions together and placing the faces in sealing position. A flexible membrane, which may be arranged on the rotatable shaft, and a spring element may be provided in the rotor portion to maintain the sealing faces in abutment during rotation of the shaft.

20 Claims, 5 Drawing Sheets

ROTATING SEAL BODY FOR FACE TYPE SEAL

This is a continuation of the U.S. application Ser. No. 7/959,173, filed Oct. 9, 1992 now abandoned, which was a continuation of the U.S. application Ser. No. 7/682,124, filed Apr. 8, 1991 and is now abandoned.

BACKGROUND OF THE INVENTION

This invention relates to a rotating seal body for a face type seal, which may be unitized and which has an axial flexing membrane, and is more particularly directed to such a seal for use with a rotatable shaft and a fixed bore. Such seals are particularly useful for shafts carrying an impeller within a fluid filled housing such as may be found on a fluid pump.

One problem with prior art seals is that heat of friction generated by relative motion of the seal faces causes such seals to fail prematurely. Additionally, the structure of known prior art seals causes the sealing faces to address one another in a cam-like motion to keep the faces in sealing abutment, thus placing the seal under greater stress.

Another difficulty with some conventional seals is with the need to design into them a relatively high rate (lbs. per inch) compression spring. Such a prior art spring also has requirements for seating on a suitable surface against the membrane or bellows, and that structure must be built into the prior art seal.

In order for a face type seal to properly function, two surfaces, one rotating and the other stationary, must contact each other in sealing abutment. Regardless of the seal face materials employed, frictional heat due to relative motion is generated. Some of this heat can be dissipated into the medium being sealed. However, when the sealed medium is hot or not present, such as in periods of fluid aeration, dissipation of frictional heat is not possible. Many face type seals fail under such conditions because of seal face distortion or cracking.

In the present invention, a heat flow path is created from the stationary face through the heat conductive metal stamping which presses into the pump housing or its equivalent. The pump housing or its equivalent exhibits large surface areas and is generally constructed from a thermally conductive material which allows heat to flow away from the seal faces. This is especially true when pump cavitation occurs or there is a lack of the sealed medium. In the present invention, the stationary seal face is resiliently and sealingly positioned while maintaining the described heat transfer path.

It is known that fluid leakage between metal to metal press fits on to the pump shaft can occur due to lobbing or out-of-roundness. Generally, a penetrant type of sealant is applied to prevent such leakage. However, due to the low viscosity of such a sealant, it is not uncommon for the sealant to be deposited onto a seal face, thus impairing proper sealing. The present invention allows the resilient annular membrane of the seal to be positioned directly onto the shaft and maintain unitization of the sealing faces, and this is desirable, since the resiliency of this member conforms to lobbing or out-of-roundness creating a seal without the use of such additional sealants.

In normal face seal usage, it is not uncommon for one of the seal faces to be installed out of square or at a position which is not perpendicular to the shaft axis of rotation. When the resilient annular member is part of the stator and the rotating seal face is unsquare, it is necessary for the stator seal face to tilt axially to remain in sealing abutment. This tilting can be compared to a cam-like action and will occur at the speed of the shaft rotation. The mass of this seal face and its related components represents an inertia which must be moved during each rotation of the shaft. Lack of movement or a delay in the exact time of movement will cause the seal faces to part from sealing abutment. By positioning the resilient annular member on to the rotating shaft, the need for this cam-like motion is eliminated. When such a seal is mounted unsquare to the shaft axis of rotation, the resilient annular member allows the rotating face to assume a plane that conforms to the plane of the unsquarely mounted face. During shaft rotation, this plane is maintained and no cam-like motion of one of the seal faces is necessary to keep the faces in sealing abutment. By use of the present invention, the seal faces remain in abutment without objectionable cam-like motion and the work of maintaining abutment under such circumstances is eliminated, thus reducing wear and tear on the seal components.

In a seal embodying the present invention, a heat transfer path is built into the seal to dissipate the heat of friction generated by the relative motion of the seal faces before the heat damages the seal structure. This heat transfer path not only provides means for dissipating heat of friction, but also specifically directs heat being dissipated to portions of the seal where the heat can be readily conducted in a defined direction away from a heat reservoir which would normally build up at the seal faces and damage seal components. This directed path can be achieved by selecting one seal face of relatively high thermal conductivity and the other seal face of relatively low thermal conductivity and placing the seal face of high thermal conductivity in thermal conducting relation to a conductive mass which absorbs the heat to be dissipated.

Such a structure allows the resilient annular membrane of the seal to rest directly on the shaft, and such a position of the resilient annular member on the rotating shaft results in a fixed plane of rotation for the seal faces, even when the stationary face of the seal is not assembled perpendicularly to the axis of rotation of the shaft, thus eliminating the need for one of the faces of the seal to move in a cam-like motion for keeping the faces in sealing abutment, as described, which would be otherwise necessary.

By use of a face seal embodying the present invention, a low rate spring may be employed and such a spring does not require such critical seating as a prior art spring. Additionally, the present invention permits the use of positive drive features with rapid dissipation of heat, and the axial flexing membrane need not absorb the axial compression length of the spring, thus lengthening seal life.

In applications where a suitable surface to position a compression spring cannot be located and sealing directly on the shaft with a flexible axial sealing element is not required, a seal embodying the present invention can be packaged to utilize a finger spring as an alternative to a low rate spring, and such a finger spring is suitable to deliver an axial load to the seal faces. In any event, the axial flexing membrane is prepositioned and the seal face will rotate in a fixed plane regardless of the position of the non-rotating face and the compression on the spring.

Unitizing (providing a seal assembly where the stator and rotor portions are interconnected together) is also easily accomplished with a seal embodying the present invention, and such packaging can be achieved by providing a rolled lip or lugs on the rotor portion of the seal over which the stator portion is engaged.

OBJECT OF THE INVENTION

It is the object of the present invention to provide a rotating seal body for a face type seal of the character described.

Another object of the invention is to provide a rotating seal body which has a heat transfer path through it for dissipating the heat of friction generated by the relative motion of the seal faces under operating conditions.

Another object of the invention is to provide a face type seal which includes seal components of different thermal conductivity to define the direction of such a heat transfer path for dissipating heat of friction.

Another object is to provide a resilient annular membrane for a seal rotor which rests directly on to the shaft of the device in which the seal is mounted.

Another object is to provide such a membrane which will allow the seal faces to rotate in a fixed plane even when the stationary face is not arranged perpendicularly to the axis of rotation of the shaft.

Another object is to provide a rotating seal body for a face type seal which is capable of using a low rate spring and can position its axial flexing membrane in a predetermined state.

Another object is to provide such a seal body for a face type seal utilizing a low rate spring which does not require a critical surface in its host environment for mounting one face of the spring.

Another object is to provide such a seal body for a face type seal which includes positive drive features.

Another object of the invention is to provide a seal body which is capable of alternatively using either a finger spring or a low rate spring for delivering an axial load to the seal faces.

Another object is to provide a novel face type seal of the character described which can be easily unitized by providing a projection on one portion and another portion which interlocks over the projection.

Another object is to provide a rotating seal body for a face type seal which is efficient and economical in manufacture and use.

These and other objects and advantages in the present invention will become more apparent as this description proceeds, with reference to the following description of preferred embodiments, taken in conjunction with the accompanying drawings.

DESCRIPTION OF PREFERRED EMBODIMENTS

Figure 1:
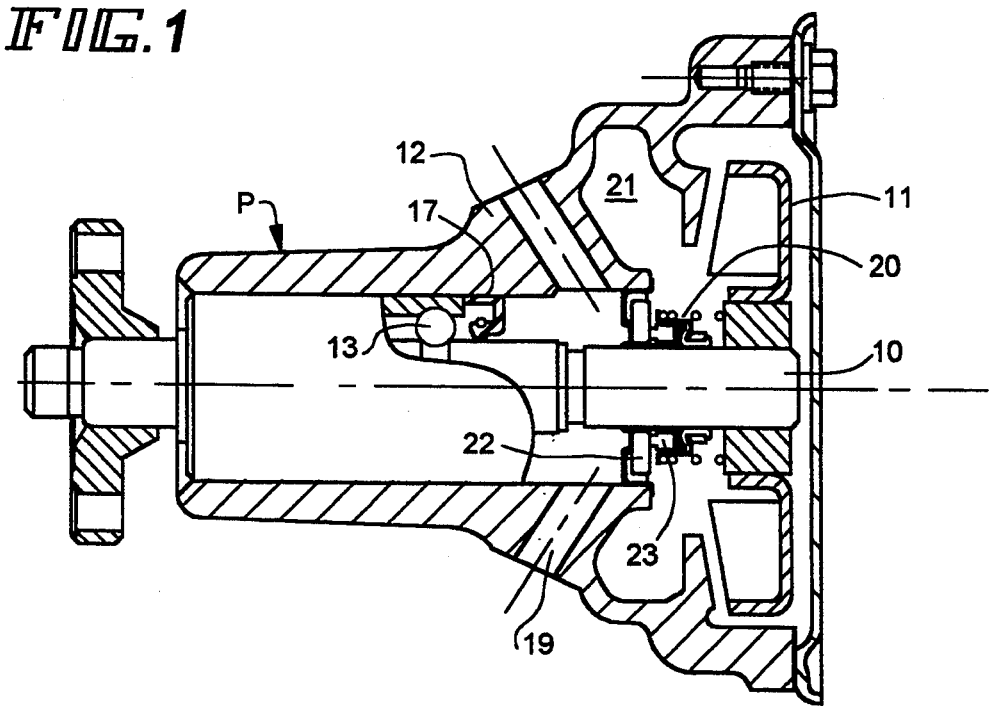
FIG. 1 is a sectional view of a face type seal embodying the present invention installed in a pump body.

With reference to the accompanying drawings and particularly to Fig. 1-4, in a typical pump P a shaft 10 carries an impeller 11 secured on one end thereof within the pump housing 12. The shaft 10 may be mounted on bearings 13 which fit into the bearing bore and the bearing lubricant is conventionally retained by a radial lip seal 17. The pump housing 12 may have a drain passage 19 therein vented to atmosphere and acting as a weephole in the event of seal leaks.

A Preferred Embodiment

A seal 20 embodying the present invention is used to close a fluid filled cavity 21, and this seal comprises a stator body 22 interlocked with a rotor body 23 within the housing 12. The stator body 22 has a flanged annular resilient mounting washer 24 which holds it, and a flanged heat transfer metallic ring 25 of thermal conductive material which secures the stator body 22 and washer 24 and the assembly usually press fits into the housing 12.

The rotor body 23 is seated in position by a unitizing metallic ring 26 which, with a rotor assembly component engages a resilient annular membrane 28 therebetween. This membrane 28 is securely fitted directly on to the shaft 10 by means of a compression ring 29. The rotor assembly component 27 has a peripheral flange 30 against which a low rate spring 31 is seated, and the other end of the spring 31 bears against a wall 32 of the impeller 11.

As the shaft 10 and its impeller 11 turns, the rotor body 23 and its associated unitizing ring 26, component membrane 28, compression ring 29, and spring 31 rotates with it, causing the sealing face 33 of the rotor body 23 to rub on the sealing face 34 of the stator body 22, thus building up substantial heat of friction.

Rather than transmit this heat of friction to the seal components, particularly flexible parts, like mounting washer 24 and membrane 28, causing them to fail and perhaps loosening the seal, as by allowing the sealing faces 33-34 to cant relative to one another, this heat of friction is transmitted and dissipated through a heat transfer path defined by the stator body 22, the flanged heat transfer metallic ring 25 to the housing 12.

Preferably, the stator body 22 is constructed of material having relatively high thermal conductivity, such as sintered iron which has a thermal conductivity rate (BTU×ft./hr.×ft. 2×per degree F.) of 50, and the rotor body 23 is constructed of material having relatively low thermal conductivity, such as carbon which has a thermal conductivity rate of 5. The metallic ring 25 is 'spanked' flat against the stator body 22 to assure a good heat transfer surface. The housing 12 is preferably a dense metallic body which can rapidly absorb heat dissipated from the rubbing seal faces 33–34. By arranging the components in the manner described the heat transfer path is well defined for maximum heat dissipation, even under severe operating conditions.

Thus, the sealing faces 33–34 remain parallel to one another and perpendicular to the shaft 10 and the flexure of the resilient annular membrane 28 is minimal and within its working dimensions, without being affected by distortions caused by heat of friction. Likewise, the spring 31 can be of a low rate because substantial length and compression of the spring is not required.

Figure 2:
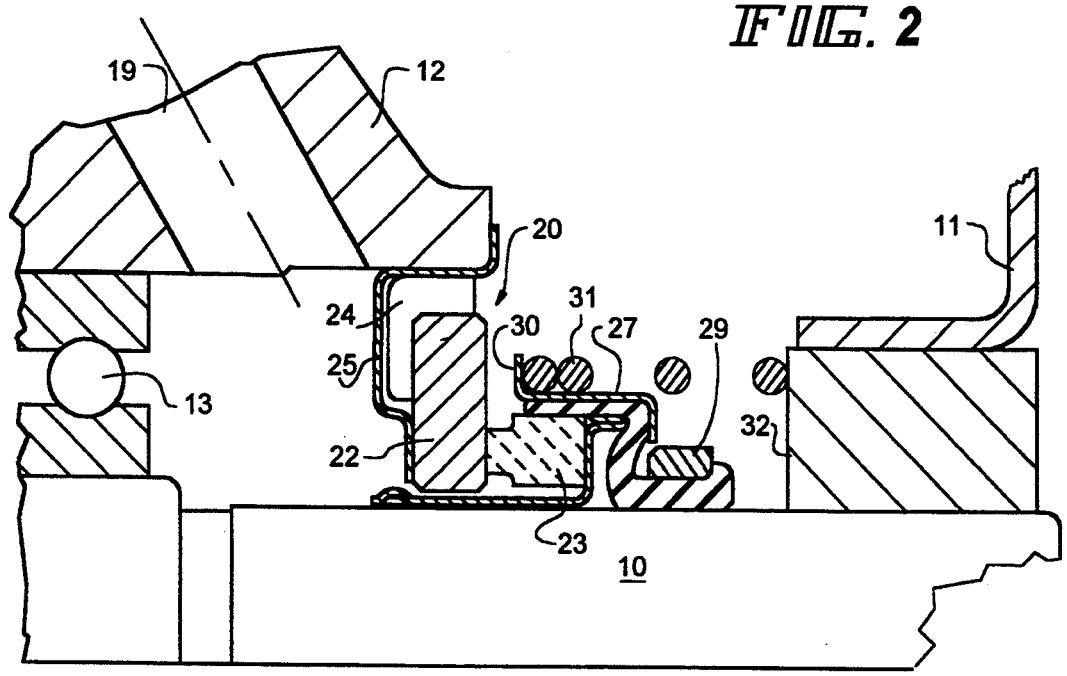
FIG. 2 is an enlarged detailed sectional view of part of the pump body shown in FIG. 1, with the novel seal installed.
Figure 3:
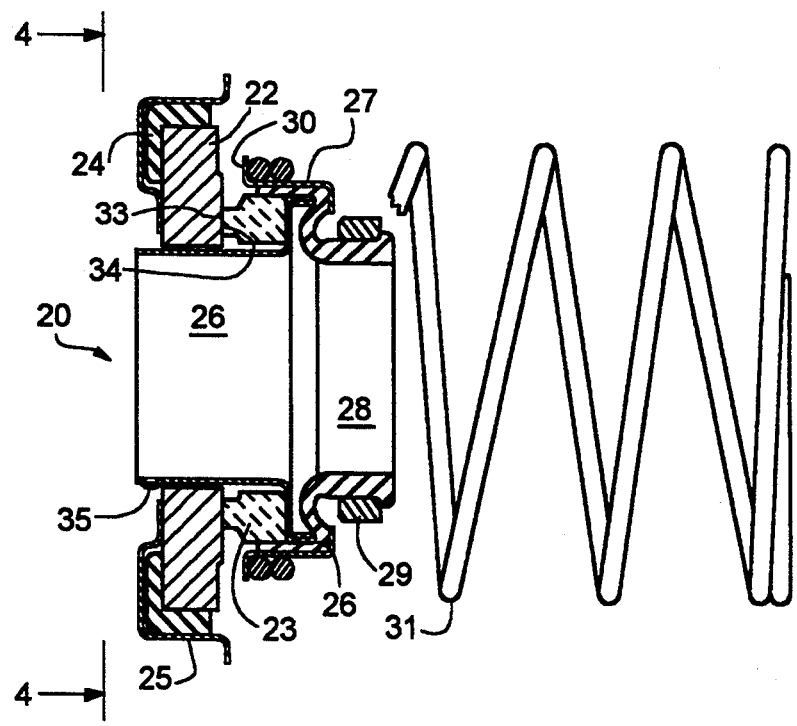
FIG. 3 is an sectional view of the seal shown in FIG. 1, with pump parts omitted.
Figure 4:
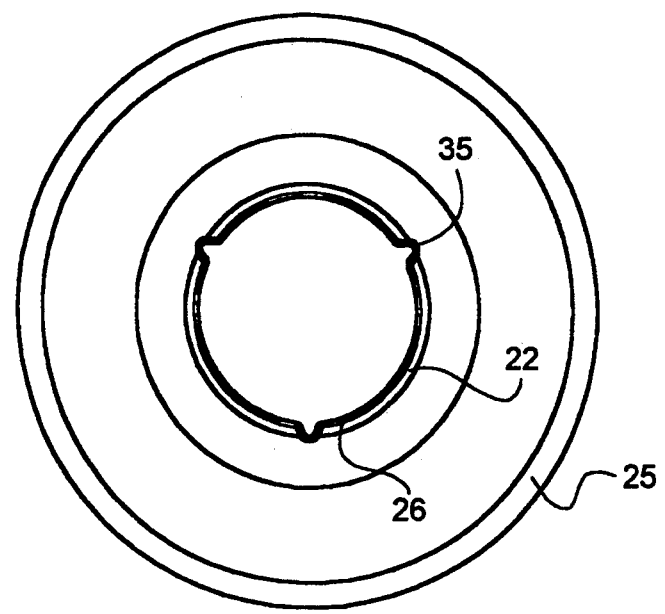
FIG. 4 is an elevation view from the stator side of the seal, taken on line 4—4 of and at a right angle to FIG. 3.

Also, the face seal embodying the present invention can be unitized, as shown, by striking spaced apart lugs 35 from the ring 26 to hold the assembled seal components in place, as shown in FIG. 2. Also, the face seal embodying the present invention can be unitized as shown by rolling over its flange and providing a rolled lip thereon, depicted in FIG. 11 and hereinafter discussed.

Figure 5:
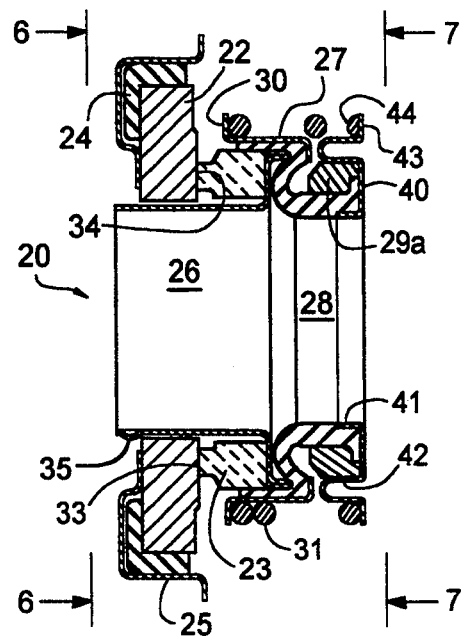
FIG. 5 is a sectional view of a second embodiment of a face seal similar to FIG. 3, except showing a seal structure where the spring is retained by a special spring retention member.
Figure 6:
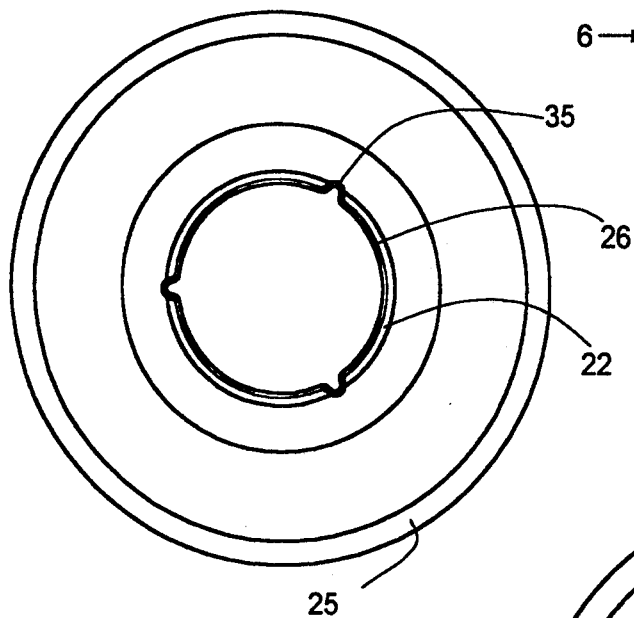
FIG. 6 is an elevational view of the stator side from the second embodiment of the seal shown in FIG. 5, taken on line 6—6 of and at a right angle to FIG. 5.
Figure 7:
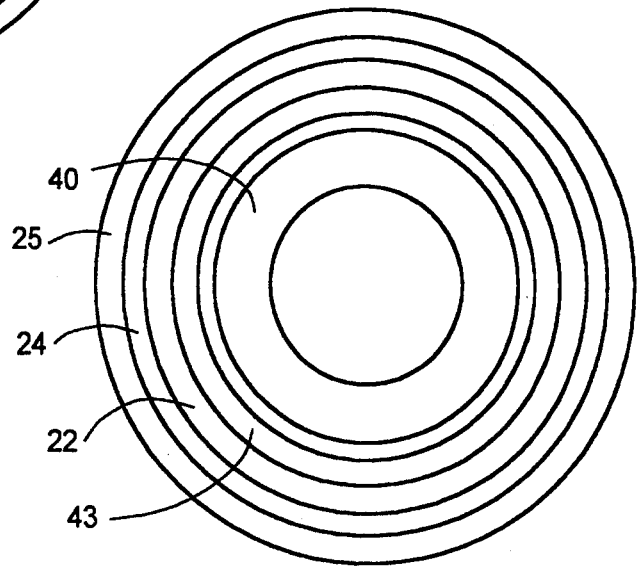
FIG. 7 is an elevation view from the rotor side of the second embodiment of the seal shown in FIG. 5, taken on line 7—7 of and at a right angle to FIG. 5.

A Second Modified Embodiment Spring Retention Member

Where the face seal 20 embodying the present invention is to be used in an environment where there is no suitable surface for holding the end of the spring 31 remote from the sealing faces 33–34, as shown in FIGS. 5–7, accommodation within the scope of the invention can be made. In this embodiment, a special spring retention member 40 can be designed into the seal.

This spring retention member 40 has a flange 41 for receiving the resilient annular membrane 28 with a shaped compression ring 29a fit thereover for securement to the shaft 10. A U-shaped lip 42 holds the retention ring 40 in position. This spring retention member 40 also has a spring receiving flange 43 adapted to carry the end 44 of the spring 31.

A Third Modified Embodiment Positive Drive Features

Figure 8:
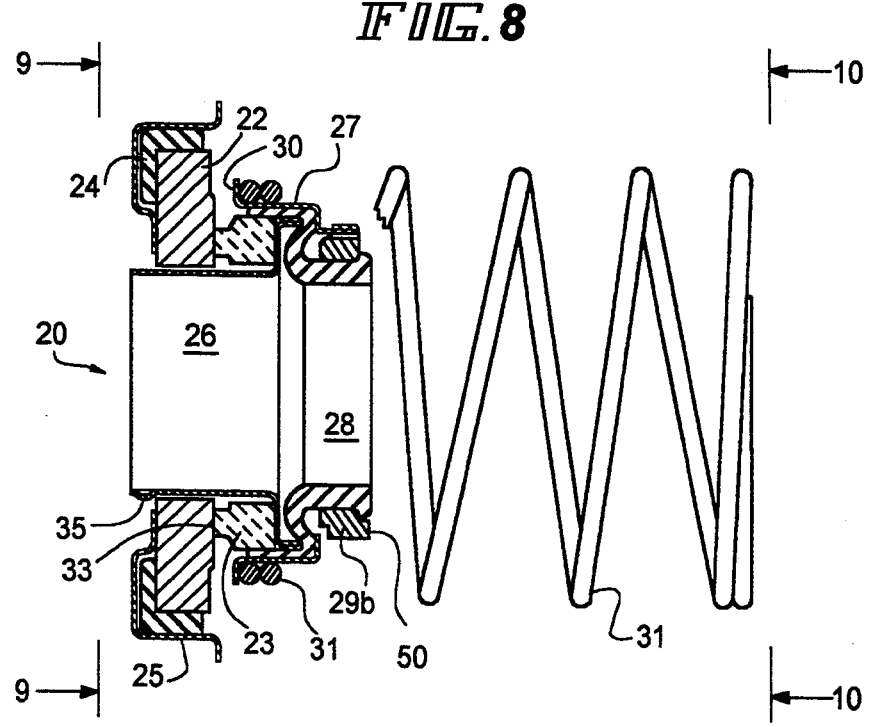
FIG. 8 is a sectional view of a third embodiment of a face seal similar to FIG. 3, except showing a seal structure with positive drive features.
Figure 9:
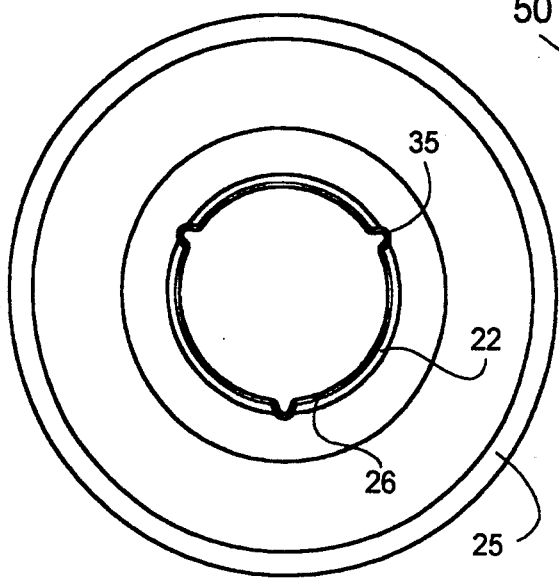
FIG. 9 is an elevational view from the stator side of the third embodiment of the seal shown in FIG. 8, taken on line 9—9 of and at a right angle to FIG. 8.
Figure 10:
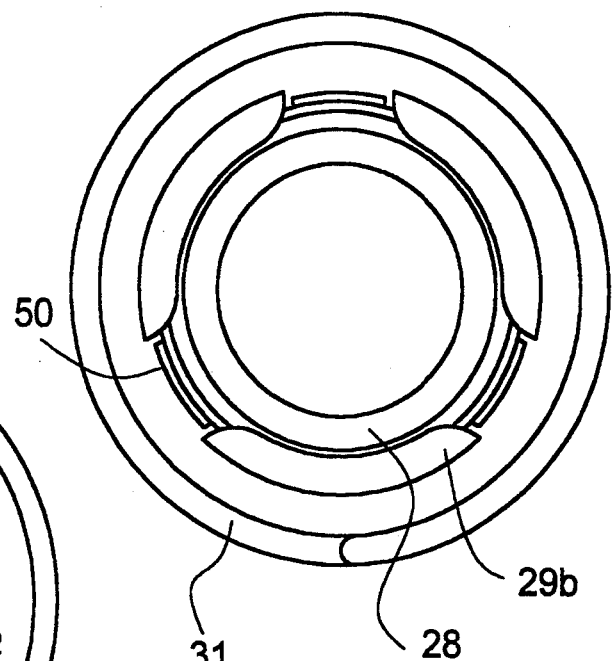
FIG. 10 is an elevational view from the rotor side of the third embodiment of the seal shown in FIG.8, taken on line 10—10 of and at a right angle to FIG. 8.

In applications where cyclic or harmonious rotation of the shaft is not experienced, a face seal 20 embodying the present invention provides a path for dissipation of seal face heat of friction, but which still permits positive drive features to be utilized. With reference to the features disclosed in FIGS. 8–10, positive drive features in the nature of spaced apart projections 50 along the periphery of the compression ring 29b can be provided to interlock with other elements so that the rotor body may drive or be driven with the turning of the shaft 10 through the fit of the membrane 28 on to the shaft 10.

In this instance, the continued ability to preposition the axial flexing membrane 28 into its working position allows it to be fabricated so that it need not absorb the axial compressive length of the spring 31, while in a conventional seal this membrane usually absorbs the axial compressive length of the spring, requiring it to be fabricated with an accordion or bellows section, which has been shown to limit seal life. In this embodiment the ring 29b absorbs the torque and twisting of the rotor during its rotation on the shaft, thus avoiding excessive wear on the bellows 28.

Figure 11:
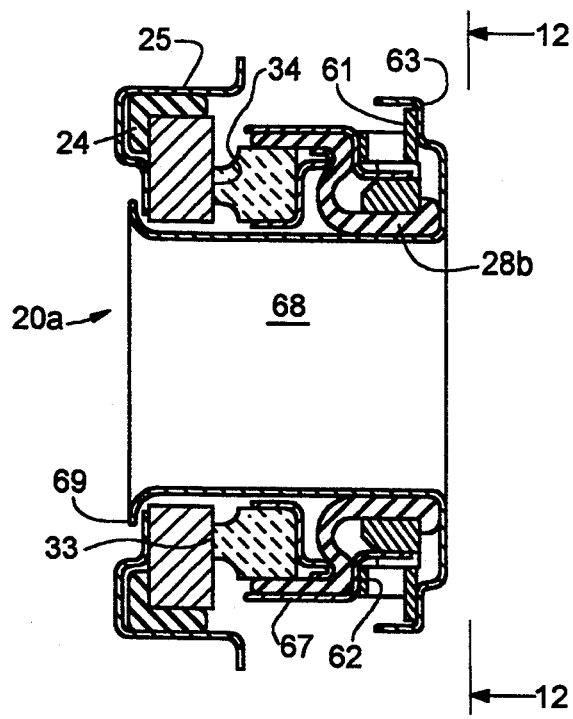
FIG. 11 is a sectional view of a fourth embodiment of a face seal similar to FIG. 3, except showing a seal structure which utilizes a finger spring and a unitizing member for mounting the seal on to the shaft.
Figure 12:
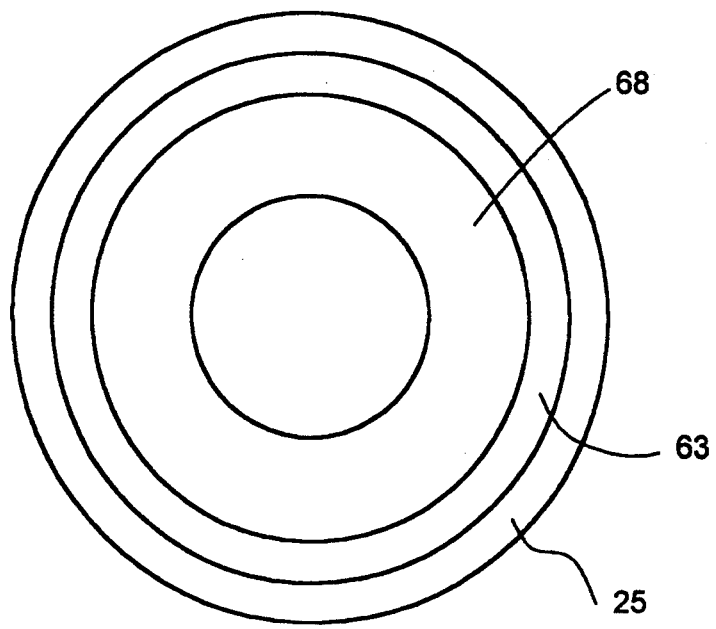
FIG. 12 is an elevational view from the rotor side of the fourth embodiment of the seal shown in FIG. 11, taken on line 12—12 of and at a right angle to FIG. 11.

Fourth Modified Embodiment Use of Finger Spring and Rolled Lip Unitizing Member In applications where a suitable surface to position the compression spring 31 cannot be obtained and sealing directly to the shaft 10 with an axial flexing membrane is not required, a face seal 20a embodying a fourth preferred embodiment, as shown in FIGS. 11 and 12, may be utilized.

In this embodiment, the heat transfer path for dissipating the heat of friction of the seal faces has been maintained along with the prepositioned axial flexing member 28b, but no low rate spring 31 is required, and instead of the low rate spring 31 a finger spring 61 is utilized. This finger spring 61 bears at one end against a wall 62 of the rotor assembly component 67 and at its other end against a upstanding flange 63 of a collar 68 press fit on the shaft 10. In each case, the axial flexing member 28b is prepositioned and the seal faces 33–34 will rotate in a fixed plane regardless of the position of the stator face and the compression on the finger spring 61 is not related to this positioning.

In this embodiment, a low rate or other spring 31 may be used instead of the leaf spring described.

Also, as shown in FIG. 11, this face seal 20a is unitized by means of a rolled lip 69 on the collar 68 which holds the ring 25 in position and such a rolled lip may be used in place of the lugs 35 shown in the other embodiments for unitizing the stator and rotor portions of the seal.

While preferred embodiments of the invention have been shown and described in detail, many changes can be made in the illustrative seal assemblies shown and described without departing from the nature and spirit of the invention. It is not desired that the invention should be limited to the exact construction illustrated and described, except as the same may be limited by the appended claims.

I claim:

1. A face seal assembly for sealing a rotatable shaft having an axis in a fluid-filled housing, said assembly comprising a rotor portion for securement on and rotatable with said shaft and a stator portion for securement in said housing, said portions being assembled together in cooperative relation, each said portion having a sealing face, the sealing face of one portion being in face-to-face rubbing abutment with the sealing face of the other portion, a resilient membrane contained within said rotor portion, adapted for flexing within a predetermined dimension, holding means for maintaining said membrane within said dimension, a spring having one end bearing against said holding means and the other end remote from said one end bearing against another surface rotatable with said shaft for resiliently maintaining said membrane within said dimension and said sealing face of said rotor portion in sealing engagement with said sealing face of said stator portion, and unitizing means, coupled to said rotor portion and adapted to be placed around said shaft, for connecting said portions together, said unitizing means having two ends, one of said ends having a substantially annular configuration, substantially all of said one end being in contact with one side of said membrane at a particular location with said holding means being in contact with the other side of said membrane at said particular location.

2. The face seal assembly of claim 1 wherein said holding means comprises a metallic ring forming part of said unitizing means and a rotor assembly component.

3. The face seal assembly of claim 2 wherein said membrane is secured between said metallic ring and said component.

4. The face seal assembly of claim 2 wherein a rotor body carrying said rotor portion sealing face is secured to said metallic ring.

5. The face seal assembly of claim 2 wherein said rotor assembly component has an annular flange against which abuts one end of said spring.

6. The face seal assembly of claim 2 wherein said metallic ring is adapted for press fitting onto said shaft.

7. The face seal assembly of claim 1 wherein said unitizing means retains said stator and rotor portions together in a sealing orientation.

8. The face seal assembly of claim 7 wherein said unitizing means includes projections on one portion which secure the other portion thereover in position for placing said faces together in sealing abutment.

9. The face seal assembly of claim 7 wherein said unitizing means includes a rolled lip on the rotor portion which engages over said stator portion and holds said portions unitized in a sealing orientations.

10. A face seal assembly for sealing a rotatable shaft having an axis in a fluid-filled housing, said assembly comprising a rotor portion for securement on and rotatable with said shaft and a stator portion for securement in said housing, said portions being assembled together in cooperative relation, each said portion having a sealing face, the sealing face of one portion being in face-to-face rubbing abutment with the sealing face of the other portion, a resilient membrane contained within said rotor portion, said membrane, in planes including said axis, having sufficient dimension in a curved configuration to flex axially in either direction within a predetermined dimension, clamping means, coupled to said membrane, for maintaining said membrane in substantially fluid-tight contact to and at a fixed location circumferentially around said shaft, holding means for maintaining said membrane within said dimension, a spring having one end bearing against said holding means and the other end remote from said one end bearing against another surface rotatable with said shaft for resiliently maintaining said membrane within said dimension and said sealing face of said rotor portion in sealing engagement with said sealing face of said stator portion, said assembly having unitizing means for retaining said stator and rotor portions together in a sealing orientation, said unitizing means having projections on one portion which secure the other portion thereover in position for placing said faces together in sealing abutment, said unitizing means having two ends, one of said ends having a substantially annular configuration, substantially all or said one end being in contact with one side of said membrane at a particular location with said holding means being in contact with the other side of said membrane at said particular locations.

11. The face seal assembly of claim 10 wherein said clamping means includes a compression ring surrounding and holding said membrane onto said shaft.

12. The face seal assembly of claim 10 wherein said holding means comprises a metallic ring and a rotor assembly component.

13. The face seal assembly of claim 12 wherein said membrane is secured between said metallic ring and said component.

14. The face seal assembly of claim 12 wherein a rotor body carrying said rotor portion sealing face is secured to said metallic ring.

15. The face seal assembly of claim 12 wherein said rotor assembly component has an annular flange against which abuts one end of said spring.

16. The face seal assembly of claim 10 wherein said membrane defines a bellows for flexing relative to movement of said spring.

17. A face seal assembly for sealing a rotatable shaft having an axis in a fluid-filled housing, said assembly comprising a rotor portion for securement on and rotatable with said shaft and a stator portion for securement in said housing, said portions being assembled together in cooperative relation, each said portion having a sealing face, the sealing face of one portion being in face-to-face rubbing abutment with the sealing face of the other portion, a resilient membrane contained within said rotor portion, said membrane, in planes including said axis, having sufficient dimension in a curved configuration to flex axially in either direction within a predetermined dimension, clamping means, coupled to said membrane, for maintaining said membrane in substantially fluid-tight contact to and at a fixed location circumferentially around said shaft, holding means for maintaining said membrane within said dimension, a spring having one end bearing against said holding means and the other end remote from said one end bearing against another surface rotatable with said shaft for resiliently maintaining said membrane within said dimension and said sealing face of said rotor portion in sealing engagement with said sealing face of said stator portion, said assembly having unitizing means for retaining said stator and rotor portions together in a sealing orientation, said unitizing means having a rolled lip on the rotor portion which engages over said stator portion and holds said portions unitized in a sealing orientation, said unitizing means having two ends, one of said end of said having a substantially annular configuration, substantially all of said one end being in contact with one side of said membrane at a particular location with said holding means being in contact with the other side of said membrane at said particular location.

18. The face seal assembly of claim 17 wherein the rotor portion of said seal includes drive means rotatable with said shaft.

19. The face seal assembly of claim 18 wherein said drive means comprise projection means extending from said rotor portion and adapted to engage means for interlocking said rotor portion to another element for rotation with said shaft.

20. The face seal assembly of claim 17 wherein said membrane defines a bellows for flexing relative to movement of said spring.

* * * * *